US005173233A

United States Patent [19]

Kafarowski

[11] Patent Number: 5,173,233

[45] Date of Patent: Dec. 22, 1992

[54] PROCESS FOR FORMING DECORATIVE CONCRETE SLABS

[76] Inventor: Z. Grant Kafarowski, 523 Bower Road, Concord, Ontario, Canada, L4K 1B2

[21] Appl. No.: 777,651

[22] Filed: Oct. 16, 1991

[30] Foreign Application Priority Data

Jul. 24, 1991 [CA] Canada ................................ 2047787

[51] Int. Cl.[5] ......................... B28B 1/08; B29C 39/12; B32B 31/00

[52] U.S. Cl. ...................................... 264/113; 264/24; 264/69; 264/71; 264/73; 264/118; 264/122; 264/139; 264/162; 264/245; 264/333

[58] Field of Search .................. 264/71, 69, 219, 138, 264/139, 162, 245, 296, 333, 340, 232, 73, 74, 77, 113, 118, 122, 24

[56] References Cited

U.S. PATENT DOCUMENTS

| | | | |
|---|---|---|---|
| 212,478 | 2/1879 | Low . | |
| 1,099,837 | 6/1914 | Black | 264/73 |
| 1,557,748 | 10/1925 | Washington . | |
| 1,597,373 | 8/1926 | Grimm . | |
| 1,619,734 | 3/1927 | Jeppson et al. | 264/71 X |
| 2,274,907 | 3/1942 | Madala | 264/139 X |
| 2,434,477 | 1/1948 | Winter | 264/245 X |
| 2,805,448 | 9/1957 | Rubenstein | 264/139 X |
| 2,819,495 | 1/1958 | Krausz . | |
| 2,835,996 | 5/1958 | De Paoli, Sr. | 264/333 X |
| 3,179,730 | 4/1965 | Ingrassia . | |
| 3,242,242 | 3/1966 | Bournique . | |
| 3,402,228 | 9/1968 | Wood et al. | 264/71 X |
| 3,437,548 | 4/1969 | Ayers | 264/162 X |
| 3,484,514 | 12/1969 | Longinotti | 264/333 X |
| 3,496,264 | 2/1970 | Grant | 264/333 X |
| 3,639,200 | 2/1972 | Elmendorf et al. | 264/162 X |
| 4,085,181 | 4/1978 | Cosentino | 264/245 X |
| 4,275,110 | 6/1981 | Margerie | 264/71 X |
| 4,420,525 | 12/1983 | Parks . | |
| 4,622,194 | 11/1986 | Rogers et al. | 264/333 X |
| 5,035,850 | 7/1991 | Yoshikawa et al. | 264/333 X |
| 5,037,600 | 8/1991 | Upchurch | 264/333 X |

FOREIGN PATENT DOCUMENTS

| | | | |
|---|---|---|---|
| 1174815 | 9/1984 | Canada | 264/139 |
| 1924536 | 11/1970 | Fed. Rep. of Germany | 264/162 |
| 2536387 | 5/1984 | France | 264/139 |

*Primary Examiner*—Karen Aftergut
*Attorney, Agent, or Firm*—Riches, McKenzie & Herbert

[57] ABSTRACT

A process for forming a poured slab, preferably of concrete, which has different colored portions. The process includes (a) pouring a wet concrete mixture of cement particles, sand particles and gravel particles into a horizontal mold cavity having a stepped mold bottom surface, (b) curing the mixture to produce a slab with a roughly horizontal rear surface and a stepped front surface corresponding to the mould bottom surface, and (c) mechanically removing the cured mixture between a cut plane generally parallel the rear surface through the slab and the front surface. The resultant slab has different portions with different coloration and appearance due to the cut plane passing through portions of the concrete having different proportions of cement, sand and gravel particles.

15 Claims, 3 Drawing Sheets

PROCESS FOR FORMING DECORATIVE CONCRETE SLABS

SCOPE OF THE INVENTION

This invention relates to poured slabs and, more particularly, to poured, preferably concrete slabs to form walls of buildings and to provide a decorative appearance.

BACKGROUND OF THE INVENTION

Precast concrete slabs are well known building materials for applications such as curtain walls, patio stones and floor sections. For example, concrete slabs are known to be provided in large sizes of, for example, twelve feet by eight feet for mounting to the superstructure of a building and to act as an exterior wall for the building. The slabs may be provided with openings and the like therein as, for example, to accommodate windows.

Known precast concrete slabs suffer the disadvantage that the choice of appearances for their external surfaces are limited. More particularly, it is extremely difficult to provide a varying colour or appearance over different sections of the same slab. Typically, expensive, timely and labour intensive processes are required to provide different textures, colours or appearances over different portions of the same slab.

SUMMARY OF THE INVENTION

To at least partially overcome these disadvantages of previously known slabs, the present invention provides a poured slab, preferably of concrete, which has different coloured portions.

An object of the present invention is to provide a concrete slab which has a surface with different coloured portions yet may be produced economically by mass production techniques.

Another object is to provide a concrete slab which has a decorative outer surface with repeating patterns of different colours.

Another object is to provide a process for manufacturing concrete slabs having decorative outer surfaces of different colour and/or textural patterns.

According to a first aspect, the present invention provides a process for forming a concrete slab comprising:

a) pouring a wet concrete mixture comprising cement particles, sand particles and gravel particles into a horizontal mould cavity having a stepped mould bottom surface, b) curing the mixture to produce a slab with a roughly horizontal rear surface and a stepped front surface corresponding to the mould bottom surface, c) mechanically removing the cured mixture between a cut plane generally parallel the rear surface through the slab and the front surface.

In a second aspect, the present invention provides a concrete slab produced by the process of the first aspect with different portions of the slab having different colouration and appearance due to the cut plane passing through portions of the concrete having different proportions of cement, sand and gravel.

In a third aspect, the present invention provides a process for forming a poured slab comprising:

providing a substantially horizontal mould cavity with side walls and a bottom surface of varying vertical height, providing a wet, flowable, curable mixture comprising particulate matter mixed in a binder, wherein the mixture includes first particles of first colours and second particles of second colours different from the first colours;

filling the cavity with said mixture;

settling the mixture in the cavity such that the first particles at least partially settle out from the second particles forming a layer adjacent the bottom surface comprising substantially the first particles with the proportion of second particles increasing with distance from the bottom surface over at least a transition layer adjacent the bottom surface, curing the mixture in the cavity to form a cured slab which has an initial outer surface conforming to said bottom surface;

mechanically removing from the cured slab parts thereof between the outer surface and a cut plane passing through the slab at different distances from the initial outer surface over different portions of the slab whereby the different portions have different visual appearances by reason of the mixture exposed along the cut plane having different proportions of said first and second particles.

The invention in its broader aspects involves creating a slab or other product which has strata or layers therein which differ in composition and then removing parts of the slab so as to expose over different portions of the slab different ones of the layers. With the layers differing in compositions so as to have a different appearance, the resultant slab has an appearance which differs from portion to portion. The slab may be formed from any mixture or composition which adopts a cured or integral mass. Preferred mixtures are concrete mixtures containing particulate matter with cement binder. Other binders could be used, for example, in mixtures with plastic binders or other adhesives such as epoxy resins and the like. The particulate matter may comprise almost any material including minerals, rocks, metal, asbestos, glass, plastic, wood and the like. By having different of the particulate matter having a different colour or texture, different appearances result where the proportions of the particles vary in different exposed layers. The particulate matter may be of different sizes.

The layers having different proportions may be formed by many different means. Preferred is the natural settling which results due to gravity, for example, when concrete mixtures settle. The invention is not limited to such settling however. For example, having some particles which are magnetic or electrically charged would permit selective layering adjacent the front surface by applying attractive (or repulsive) magnetic or electrical fields over the front surface before curing. One or more layers could be sprayed onto the bottom of a mould before the remainder of a mixture is poured into the mould for curing. Providing a temperature differential across the curing slab could also assist in layering. Depending on the method for providing layering, the particulate matter may be of the same or different sizes.

The invention advantageously provides the slab to be formed with an initially stepped front surface, stepped having regard to the location of the layers in the slab such that when the slab is, for example, cut along a flat cut plane, the cut plane will pass through different layers at desired positions to define a desired patterned appearance.

BRIEF DESCRIPTION OF THE DRAWINGS

Further aspects and advantages of the present invention will become apparent from the following description taken together with accompanying drawings in which.

DETAILED DESCRIPTION OF THE DRAWINGS

Figure 1:
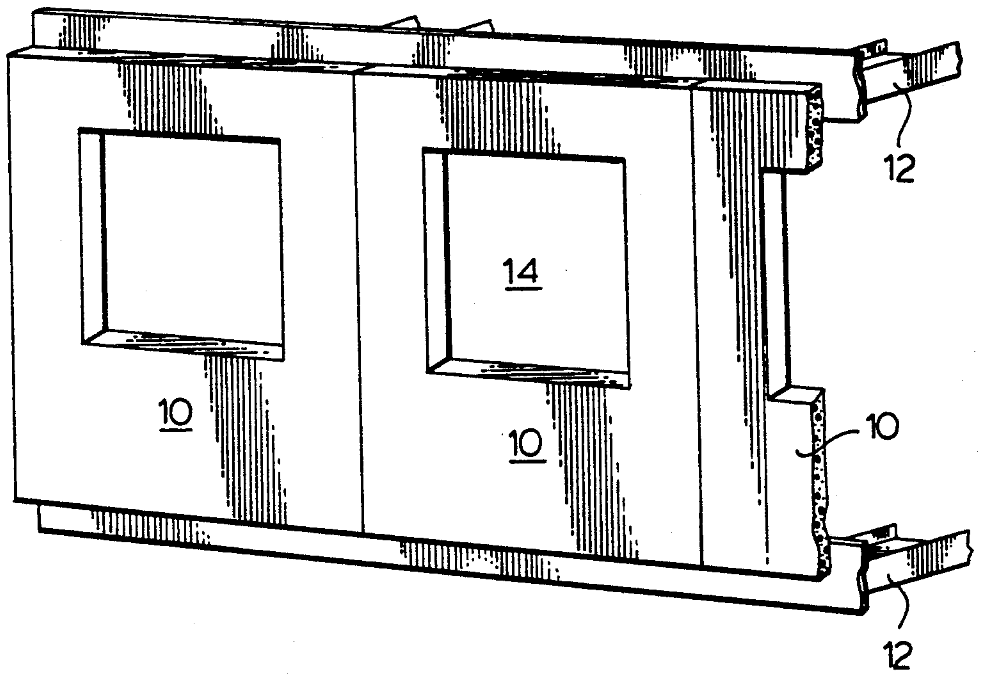
FIG. 1 is a schematic pictorial view of concrete slab wall panels secured to a building superstructure to form a curtain wall.

Reference is made first to FIG. 1 which shows a plurality of concrete slabs generally indicated 10 forming a curtain wall for a building by securing a plurality of the slabs 10 to a superstructure 12 of the building. Such concrete slab curtain walls are well known and the slabs may be secured to the superstructure by various devices not shown such as bolts and the like. Each slab may incorporate insulative layers and the like. One of the slabs is shown to have an opening for a window 14.

Figure 2:
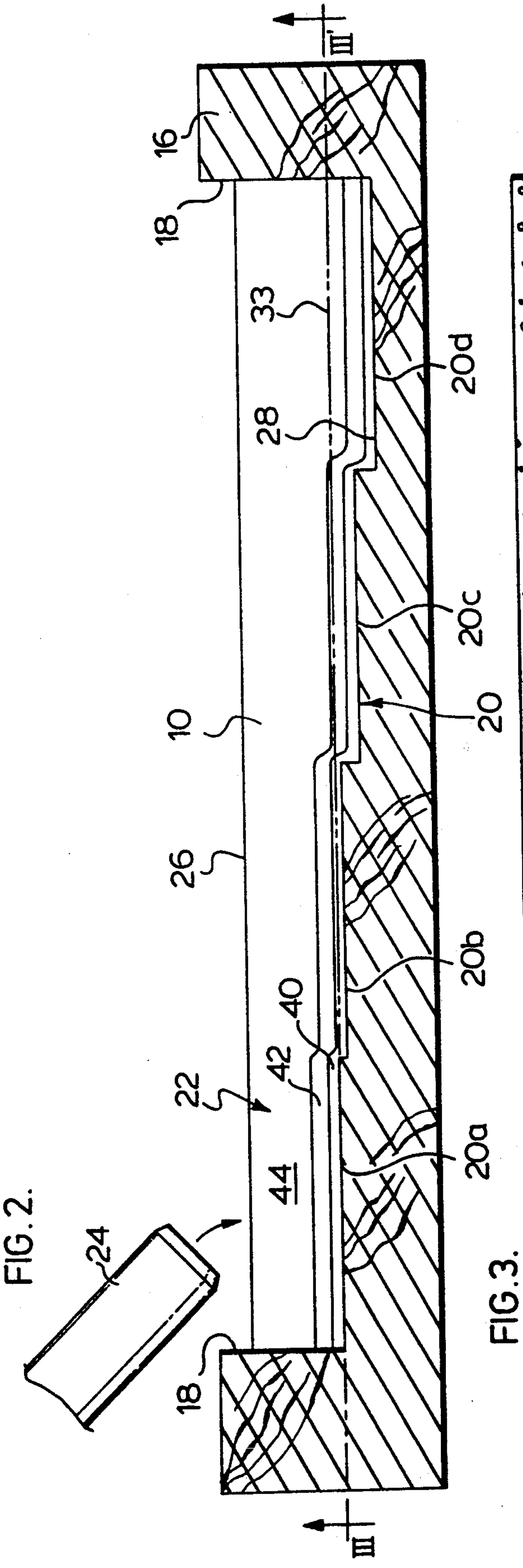
FIG. 2 is a cross-sectional view through a first embodiment of a mould cavity filled with concrete to form a concrete slab in accordance with the present invention.

FIG. 2 shows a cross-sectional side view through a first embodiment of a mould cavity 16 for use in forming a slab in accordance with the present invention. Cavity 16 has side walls 18 and a bottom surface generally indicated 20. The bottom surface 20 is shown to be disposed at varying heights within the cavity 16 as, for example, by having successive stepped levels generally indicated **20*a*, 20*b*, 20*c* and 20*d*. A mixture of wet flowable concrete generally indicated 22 is placed into the mould cavity 16 as by shute 24 so as to fill cavity 16 when disposed generally horizontally to a desired level as indicated by the rear surface 26 of slab 10**.

The slab 10 is permitted to cure within the cavity 16 and after curing, the slab is removed from the cavity 16 forming a slab having a front surface 28 matching the contours of bottom surface 20 and a rear surface 26.

Figure 4:
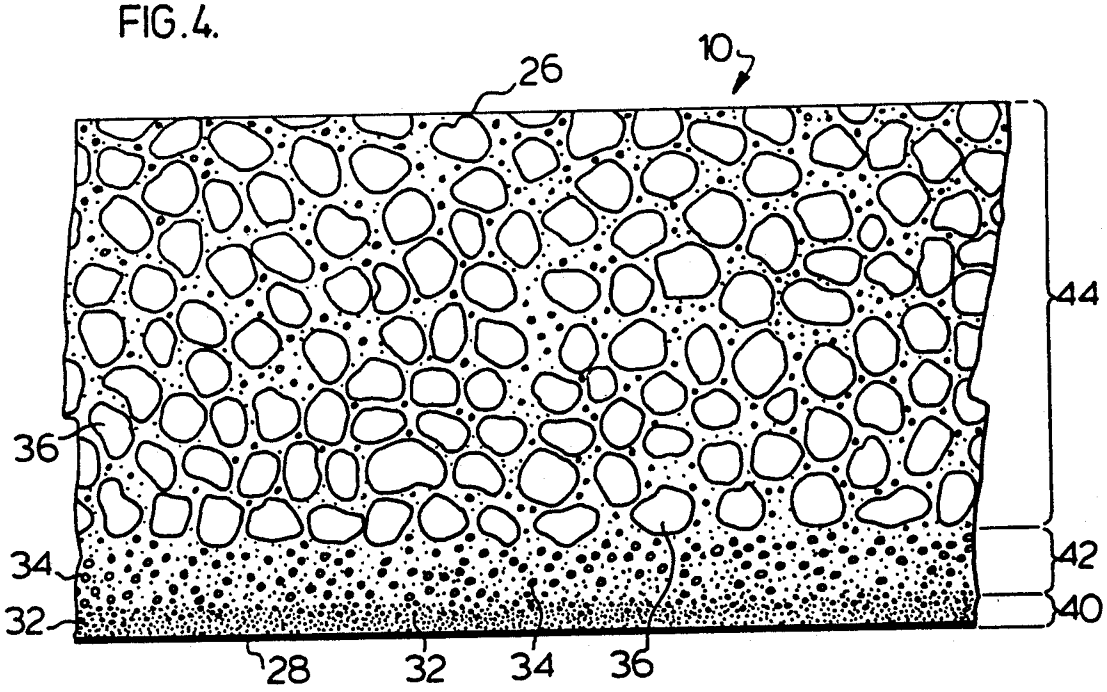
FIG. 4, on the sheet with FIG. 1, is an exploded cross-sectional of a section of the slab shown in FIG. 2.
Figure 3:
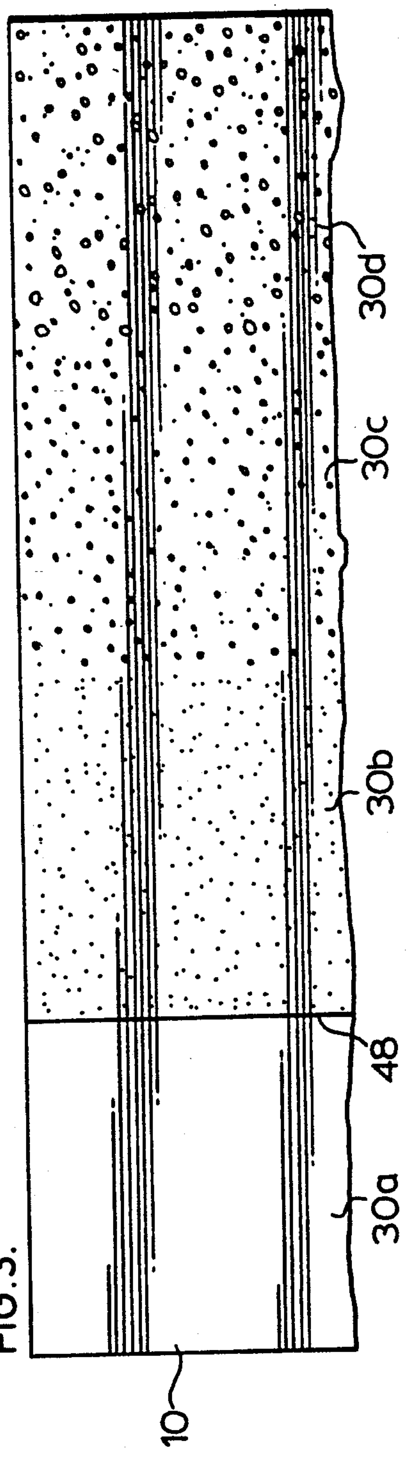
FIG. 3 is a cross-sectional view through a cured slab formed in the mould cavity of FIG. 2 after removal therefrom and after the slab has been cut along a cut plane indicated as section line III—III' in FIG. 2.

The rough slab as removed from the cavity 16 then has portions of its cured mixture removed between a cut plane 33 also indicated as section line III—III' in FIG. 2 and the front surface 28. FIG. 3 schematically shows a plan view of the completed slab having portions removed to the cut plane 33. The complete slab 10 as shown in FIG. 3 has four portions indicated **30*a*, 30*b*, 30*c* and 30*d*, respectively, each having a different appearance by reason of the front surface being formed by different proportions of particles forming the concrete. The nature of these differences is best understood by the following discussion made with reference to FIG. 4 which shows a cross-sectional view through the slab 10 of FIG. 2**.

The wet concrete mixture comprises a mixture of particles of cement 32, sand 34 and gravel 36. The cement comprises particles of a first smallest size range. The sand comprises particles of a second middle size range and the gravel comprises particles of a third largest size range. The average size of the sand is greater than that of the cement and the average size of the gravel is greater than that of the sand. When the wet cement mixture is poured into the horizontal mould, due to natural settling forces under gravity, more preferably with mechanical vibration of the wet mixture in the mould, the smaller cement particles 32 form a thin first layer 40 adjacent the bottom surface 20 of the cavity 16. This first layer 40 substantially comprises in its entirety cement particles 32. The proportions of larger sand particles 34 and gravel particles 36 increase vertically from the bottom surface 20. Conceptually, a second layer 42 is formed which comprises substantially a homogeneous mixture of sand 34 mixed with cement 32. Above this second conceptual layer 42, there is a third layer 44 which includes proportion of gravel 36 mixed in a homogeneous mixture of cement 32 and sand 34.

As to be appreciated, the proportion of gravel 36 is lowest closest the second layer 42, however, increases quickly so that a short distance rearward of the second layer 42 the concrete effectively is a homogeneous mixture of particles of cement 32, sand 34 and gravel 36.

FIG. 2 schematically shows each of these layers 40, 42 and 44. It is to be seen that these three layers set up in their vertical orientation above the bottom surface 20 over the entirety of the bottom surface and thus above each of the step levels **20*a*, 20*b*, 20*c* and 20*d*, the layers occur. FIG. 2 best shows the relative positioning of the three layers 40, 42 and 44 relative to the cut plane. The cut plane is selected in the embodiments shown in FIGS. 2 and 3 so that slab portion 30*a* has no cement removed and its outer surface appears as the front surface 28 of the slab. Over slab portion 30*b*, cut plane 33 extends through the first layer 40 which substantially comprises the cement particles 32 and thus has the appearance and colouration of a plurality of closely located cement particles 32. Over slab portion 30*c*, cut plane 33 passes through second layer 42 which presents an appearance of a substantially homogeneous mixture of sand particles 34 and cement particles 32. Over portion 30*d*, cut plane 33 passes through the third layer at a height where there is a substantially homogeneous mixture of cement 32, sand 34 and gravel 36. In the context of FIG. 3, portions 30*b*, 30*c* and 30*d* are all in the same plane whereas portion 30*a* is recessed somewhat divided by the step edge 48. As schematically shown in FIG. 3, the appearance of the front surface of the finished slab varies over portions 30*b*, 30*c* and 30*d* due to different proportions of the particles of the cement, sand and gravel being invisible. Slab portion 30*a* has a different appearance than slab portion 30*b* by reason of uncut slab portion 30*a* having a different appearance than the cut first layer 40** as would be appreciated by a person skilled in the art.

Preferably, each of the cement, sand and gravel may be chosen to be of different colours. In this manner, the relative proportions of the cement, sand and gravel will give different colouration and appearance to each of the slab portions. Of course, each of the cement, sand or gravel may comprise one or more colours which may be different from one or more colours of the other of the particles. Only some proportions of the cement, sand or gravel may be coloured.

Aside from the colour of the particles comprising the cement, sand and gravel, the relative size distribution for each of the cement, sand and gravel and the relative sizing between the cement, sand and gravel will impact on the visual appearance of the final product. Moreover, the shape of the sand and gravel may be chosen. For example, rounded sand or rounded, tumbled gravel may provide a different appearance than, for example, angled sand particles or crushed gravel.

The distance of the cut plane 33 from the front surface 28 of the slab will also vary the appearance of the cut slab. For example, to the extent the cut plane may pass closely adjacent the interface between the second and third layers 42 and 44, a smaller proportion of gravel may lie in the cut plane as contrasted with locating the cut plane a greater distance into the third layer 44 where a greater number of gravel particles will lie in the cut plane.

Figure 5:
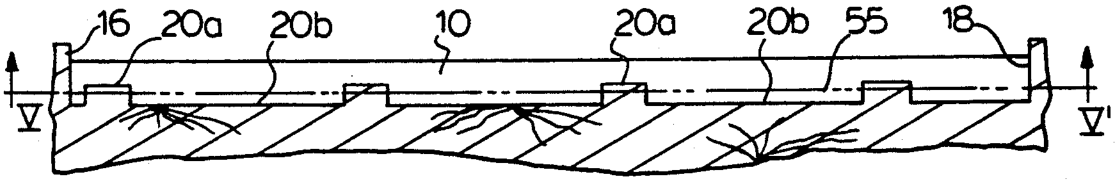
FIG. 5 is a cross-sectional view through a second embodiment of a mould cavity for forming a slab in accordance with the present invention.
Figure 6:
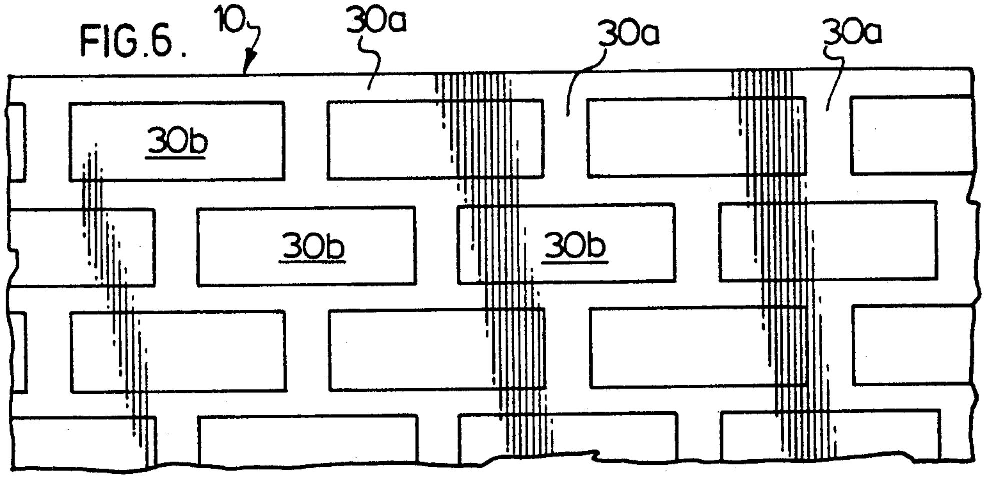
FIG. 6 is a plan view of a slab formed in the mould cavity of FIG. 5 after removal from the mould and after cutting along a cut plane indicated as section line V—V' in FIG. 5.
Figure 7:
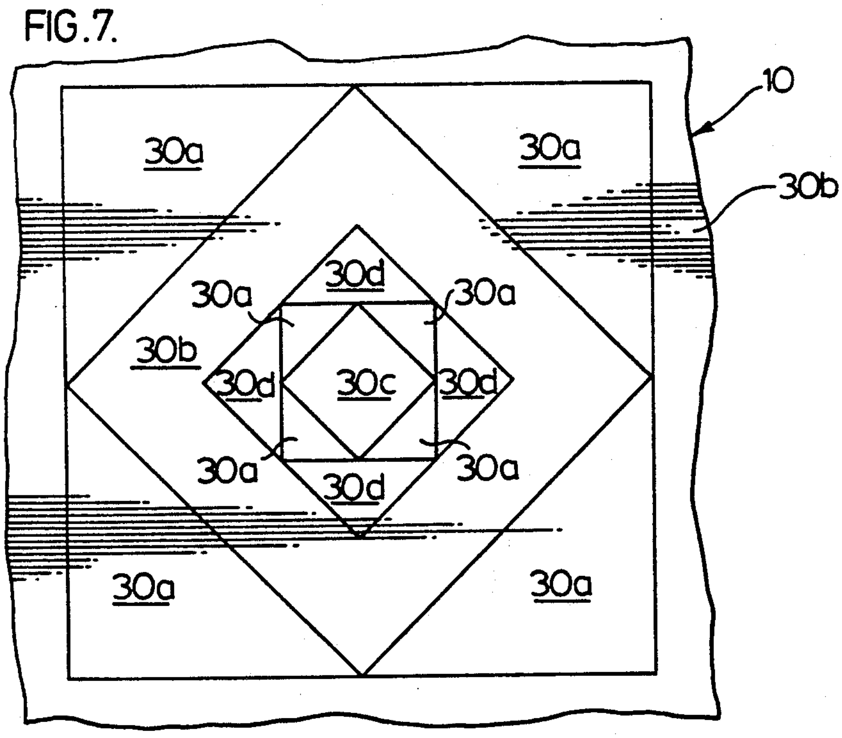
FIG. 7 is a plan view of a slab formed in accordance with the present invention in a third embodiment of the mould cavity.

In each of FIGS. 5, 6 and 7, similar reference numerals are indicated to locate similar elements. While not clearly shown in each of FIGS. 5, 6 and 7, each portion 30*a*, 30*b*, 30*c* and 30*d* are intended to indicate portions which are formed similarly and would have similar appearance to the portions 30*a* to 30*d* shown in FIG. 3.

Reference is now made to FIG. 5 which shows a second embodiment of a mould cavity in accordance with the present invention. In a second embodiment, the mould cavity 16 has similar side walls 18 and a bottom wall 20 are consistent height except where raised levels 20*a* are provided. As may be appreciated from the resultant pattern on a cut slab of FIG. 6 formed from the mould of FIG. 5, these raised levels are provided in a grid-like pattern so as to give the appearance of a plurality of rectangular brick in the cut slab. When a cured slab formed from the mould of FIG. 5 is cut along the cut line indicated 55 in FIG. 5, the spaces between bricks indicated as 30*a* are uncut whereas the rectangular portions indicated as 30*b* are cut through the cement mixture so as to give a contrasting appearance with uncut recessed portions 30*a*. Cut plane 55 may pass through any of the first, second or third layers 40, 42 or 44 of the slab so as to give a desired contrasting appearance.

FIG. 7 shows a plan view of a portion of a stone slab having a pattern defined therein in accordance with the present invention. The slab 10 is indicated as having different portions 30 with all indicated portions 30*a*, 30*b*, 30*c* and 30*d* having similar appearances to those in FIG. 3. By structuring a suitable mould so as to provide suitable portions 20*a* to 20*d* at different vertical heights in the mould to correspond to portions 30*a* to 30*d*, thereafter, by cutting along a suitable cut plane, the geometric design shown with the different nested squares and resultant triangles is formed.

In accordance with the present invention, it is to be appreciated that many combinations and mixtures of different size and colouration particles may provide different appearances.

Cement is preferably used which has particle size diameters less than about 1/32nd of an inch, more preferably, less than 1/64th of an inch. Sand is preferably used which has particle size in the range of 1/32nd to 3/32nds of an inch. Gravel may be chosen to have varying sizes, however, a preferred configuration is using approximately ⅜th to ⅝th of an inch diameter or greater gravel. With particles of these preferred sizes, it has been found that the first layer 40 has a depth of equal to or less than about 1/32nd of an inch, the second layer 42 exists at a depth of about 1/32nd of an inch or 1/16th of an inch to about ⅛th of an inch. The gravel is found to first occur at a depth of between about 3/16 to ⅜ of an inch with more typically homogenity of the gravel not occurring until a depth of between about ⅜ to ½ of an inch.

The invention has been described with concrete mixtures comprising three different size particles, namely, cement, sand and gravel. It is to be appreciated that the same technique would be applicable for cement mixtures of at least two different size particles and, of course, for mixtures of two, three, four or more different size particles.

While it is preferred that the stratification of the different colouration particles arise due to their relative size, it is to be appreciated that similar results could be effected due to differences in relative density. The extent to which the concrete mixture is wet and flowable and the extent to which the concrete mixture is vibrated prior to curing can also affect the relative distribution of the particles.

The stone slab after moulding may have its concrete mixture removed to the cut line by a number of different processes. One convenient apparatus is to place a plurality of circular concrete cutting saws in staggering relation across the entire width of a slab and then to move the slab through the array of saws so as to simultaneously cut the slab to the cut plane as desired.

While the invention has been described with reference to preferred embodiments, it is not so limited. Many modifications and variations will now occur to a person skilled in the art. For a definition of the invention, reference is made to the attached claims.

The embodiments of the invention in which an exclusive property or privilege is claimed are defined as follows:

1. A process for forming a decorative slab comprising:

providing a substantially horizontal mould having a mould cavity with a bottom surface of varying vertical height, providing a wet, flowable, curable mixture comprising particulate matter mixed in a binder, wherein the mixture includes first particles of first colours and second particles of second colours different from the first colours;

filling the cavity with the mixture;

settling the mixture in the cavity such that the first particles at least partially settle out from the second particles forming a transition layer proximate the bottom surface of the mould cavity in which a relative proportion of first particles to second particles progressively changes with changes in distance of the mixture from the bottom surface of the mould cavity;

curing the mixture in the cavity to form a cured slab which has an initial outer surface of varying vertical height conforming to the varying vertical height of the bottom surface of the mould cavity;

mechanically removing surface portions from the cured slab extending from the initial outer surface of the slab to a cut plane passing horizontally through the slab to expose the mixture along the cut plane at different distances from the initial outer surface of the slab over different portions of the slab due to the initial outer surface of the slab being of varying vertical height, the different portions including a first portion and a second portion, wherein over the first portion the cut plane passes through the mixture at a first distance from the initial outer surface where the mixture has a first relative proportion of first particles and second particles, and wherein over the second portion the cut plane passes through the mixture at a second distance from the initial outer surface where the mixture has a second relative proportion of first particles and second particles, the first relative proportion of the differently coloured particles differing from the second relative proportion of the differently coloured particles such that the mixture exposed over the first portion of the slab has an appearance different in colour from an appearance of the mixture exposed over the second portion of the slab to thus form the decorative slab.

2. A process as claimed in claim 1 wherein the mould bottom surface is stepped.

3. A process as claimed in claim 1 wherein the first particles are of a first general size range and the second particles are of a second general size range different than the first general size range.

4. A process as claimed in claim 1 wherein the different portions further include a third portion in which the cut plane passes through the mixture at a third distance from the initial outer surface of the slab where the mixture has a third relative proportion of first particles and second particles, the third relative proportion of the differently coloured particles differing from the first and second relative proportions of the differently coloured particles.

5. A process as claimed in claim 1 wherein the cut plane is planar.

6. A process as claimed in claim 1 wherein portions of the decorative slab are spaced rearward of the cut plane.

7. A process for forming a decorative concrete slab comprising:

providing a substantially horizontal mould having a mould cavity with a bottom surface of varying vertical height, providing a wet, flowable, curable concrete mixture comprising particulate matter mixed in a binder, wherein the mixture includes cement particles, sand particles and gravel particles;

filling the cavity with the mixture;

settling the mixture in the cavity such that a transition layer is formed in the mixture proximate the bottom surface of the mould cavity in which relative proportions of cement particles, sand particles and gravel particles progressively change with changes in distance of the mixture from the bottom surface of the mould cavity;

curing the mixture in the cavity to form a cured concrete slab which has an initial outer surface of varying vertical height conforming to the varying vertical height of the bottom surface of the mould cavity;

mechanically removing surface portions from the cured slab extending from the initial outer surface of the slab to a cut plane passing horizontally through the slab to expose the mixture along the cut plane at different distances from the initial outer surface of the slab over different portions of the slab due to the initial surface of the slab being of varying vertical height, the different portions including a first portion and a second portion, wherein over the first portion the cut plane passes through the mixture at a first distance from the initial outer surface where the mixture has a first relative proportion of cement particles, sand particles and gravel particles, and wherein over the second portion the cut plane passes through the mixture at a second distance from the initial outer surface where the mixture has a second relative proportion of cement particles, sand particles and gravel particles, the first relative proportion of particles differing from the second relative proportion of particles such that the mixture exposed over the first portion of the slab has an appearance different from an appearance of the mixture exposed over the second portion of the slab due to the differing relative proportions of the cement particles, sand particles and gravel particles in each of the different portions of the slab to thus form the decorative concrete slab.

8. A process as claimed in claim 7 wherein the mould bottom surface is stepped.

9. A process as claimed in claim 7 wherein the cut plane is planar.

10. A process as claimed in claim 7 wherein portions of the decorative slab are spaced rearward of the cut plane.

11. A process as claimed in claim 7 wherein the cement particles comprise particles of a first size range, the sand particles comprise particles of a second size range greater on average than the first size range, and the gravel particles comprise particles of a third size range greater on average than the second size range.

12. A process as claimed in claim 11 wherein at least a major proportion of one of the cement particles, sand particles and gravel particles is of a different colour than major proportions of others of the cement particles, sand particles and gravel particles.

13. A process as claimed in claim 12 wherein in the step of settling the concrete mixture the particles of the mixture at least partially settle out with a surface layer adjacent the mould bottom surface substantially comprising cement particles, and proportions of sand particles and gravel particles in the mixture increase with increasing vertical distances of the mixture from the bottom surface of the mould cavity rearward until the mixture comprises a substantially homogeneous mixture of cement particles, sand particles and gravel particles.

14. A process as claimed in claim 5 wherein a major portion of the cement particles is of different colours than colours of a major portion of one of the sand particles and the gravel particles.

15. A process as claimed in claim 14 wherein a major portion of the sand particles is of different colours than colours of a major portion of the cement particles or the gravel particles.

* * * * *